US009033284B2

(12) United States Patent
Van Staagen

(10) Patent No.: US 9,033,284 B2
(45) Date of Patent: May 19, 2015

(54) INTEGRATED SEAT MOUNTED INCEPTOR

(71) Applicant: Michael G. Van Staagen, Duluth, MN (US)

(72) Inventor: Michael G. Van Staagen, Duluth, MN (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 168 days.

(21) Appl. No.: 13/682,165

(22) Filed: Nov. 20, 2012

(65) Prior Publication Data

US 2014/0138492 A1 May 22, 2014

(51) Int. Cl.
*A45F 5/14* (2006.01)
*B64C 13/04* (2006.01)
*B64C 27/56* (2006.01)

(52) U.S. Cl.
CPC .............. *B64C 13/04* (2013.01); *B64C 27/56* (2013.01)

(58) Field of Classification Search
USPC .................. 244/234, 122 R, 221, 118.6, 223
See application file for complete search history.

(56) References Cited

U.S. PATENT DOCUMENTS

| 2,618,447 | A | * | 11/1952 | Lecarme ........................ 244/231 |
|-----------|---|---|---------|---------|
| 3,902,379 | A | | 9/1975 | Bennett et al. |
| 4,012,014 | A | * | 3/1977 | Marshall ....................... 244/234 |
| 4,763,860 | A | * | 8/1988 | Vauvelle et al. ........... 244/122 R |
| 4,787,576 | A | * | 11/1988 | McGrady et al. ......... 244/122 R |
| 4,961,548 | A | * | 10/1990 | Adams et al. .............. 244/118.5 |
| 5,064,146 | A | * | 11/1991 | Tung .......................... 244/122 R |
| 5,125,602 | A | * | 6/1992 | Vauvelle ....................... 244/223 |
| 5,152,479 | A | * | 10/1992 | Ash et al. .................... 244/122 R |
| 5,472,156 | A | * | 12/1995 | Bivens et al. ................... 244/234 |
| 6,419,188 | B1 | * | 7/2002 | Chapman, Jr. ............. 244/118.6 |
| 8,398,023 | B2 | * | 3/2013 | Nunez et al. .............. 244/122 R |
| 8,556,216 | B2 | * | 10/2013 | Bandera ....................... 244/224 |
| 2006/0000656 | A1 | * | 1/2006 | Bisick et al. .................. 180/272 |
| 2009/0045295 | A1 | * | 2/2009 | Lundgren ..................... 244/7 C |
| 2009/0152404 | A1 | * | 6/2009 | Yount et al. ................... 244/194 |
| 2011/0018740 | A1 | * | 1/2011 | Boren et al. .................. 340/965 |
| 2011/0101176 | A1 | * | 5/2011 | Nunez et al. .................. 244/236 |
| 2011/0174920 | A1 | * | 7/2011 | Yoeli ........................... 244/75.1 |
| 2011/0204187 | A1 | * | 8/2011 | Spirov et al. .................. 244/190 |
| 2012/0025031 | A1 | * | 2/2012 | Stachniak et al. ............ 244/223 |
| 2012/0097800 | A1 | * | 4/2012 | Burroughs et al. ........... 244/197 |
| 2012/0160967 | A1 | * | 6/2012 | Scott et al. ..................... 244/223 |
| 2013/0133469 | A1 | * | 5/2013 | Rey et al. ..................... 74/558.5 |

(Continued)

FOREIGN PATENT DOCUMENTS

EP 0363739 A1 4/1990
FR 2962973 A1 1/2012

(Continued)

OTHER PUBLICATIONS

European Search Report for application EP 13192274.2, mailed Apr. 15, 2014, 8 pages.
EP Office Action, Issued Dec. 23, 2014.

*Primary Examiner* — Christopher P Ellis
*Assistant Examiner* — Medhat Badawi
(74) *Attorney, Agent, or Firm* — Cantor Colburn LLP

(57) ABSTRACT

An inceptor is provided including a control stick mounted to a seat. The control stick is movable about at least a first axis. A fly-by-wire inceptor control system is housed within a portion of the seat. The inceptor control system is configured to provide input signal indicative of movement of the control stick to a flight control system.

19 Claims, 10 Drawing Sheets

(56) References Cited

U.S. PATENT DOCUMENTS

2013/0162418 A1* 6/2013 Frayman .................. 340/407.2
2014/0091181 A1* 4/2014 Ouellette ..................... 244/223

FOREIGN PATENT DOCUMENTS

| GB | 2073114 A | 10/1981 |
| WO | 2011042746 A1 | 4/2011 |

* cited by examiner

INTEGRATED SEAT MOUNTED INCEPTOR

BACKGROUND OF THE INVENTION

This invention relates generally to aircrafts, and more particularly, to an apparatus for controlling an aircraft.

When in flight, an aircraft may be oriented about a plurality of axes. The aircraft's orientations may also be referred to as attitudes including pitch, roll and, yaw. In both fixed wing and rotary wing aircrafts, it is common for the pilot to use a variety of positionable controls, such as sticks, levers, wheels, and pedals to position the control surfaces of the aircraft, and thereby control the aircraft attitude, altitude, speed and the like. In the simplest of systems, the controls are connected by cables to the control surfaces, for example cables may connect control pedals to the rudder of a fixed wing aircraft. In more complicated systems, the controls may have mechanical connections which are boosted by hydraulic servos, or the like.

As aircraft systems become more complex, the useful space in the cockpit which is accessible to the pilots becomes more nearly filled with instruments, switches, etc. A portion of conventional control systems is positioned adjacent the pilot's seat such that the control system is an obstacle when accessing or egressing the seat quickly, such as in emergency situations for example. Not only does this positioning create a visual blockage, but it also limits the size of the person that may access the seat.

BRIEF DESCRIPTION OF THE INVENTION

According to one embodiment of the invention, an inceptor is provided including a control stick mounted to a seat. The control stick is movable about at least a first axis. A fly-by-wire inceptor control system is arranged at least partially within the seat. The inceptor control system is configured to provide input signals indicative of movement of the control stick to a flight control system.

According to another embodiment of the invention, an aircraft is provided including at least one control surface for adjusting an orientation of the aircraft. A cockpit of the aircraft includes a seat and a control stick is mounted to the seat. The control stick is movable about at least a first axis. A fly-by-wire inceptor control system is arranged at least partially within the seat. The inceptor control system is configured to provide input signals indicative of movement of the control stick to a flight control system to move the at least one control surface.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
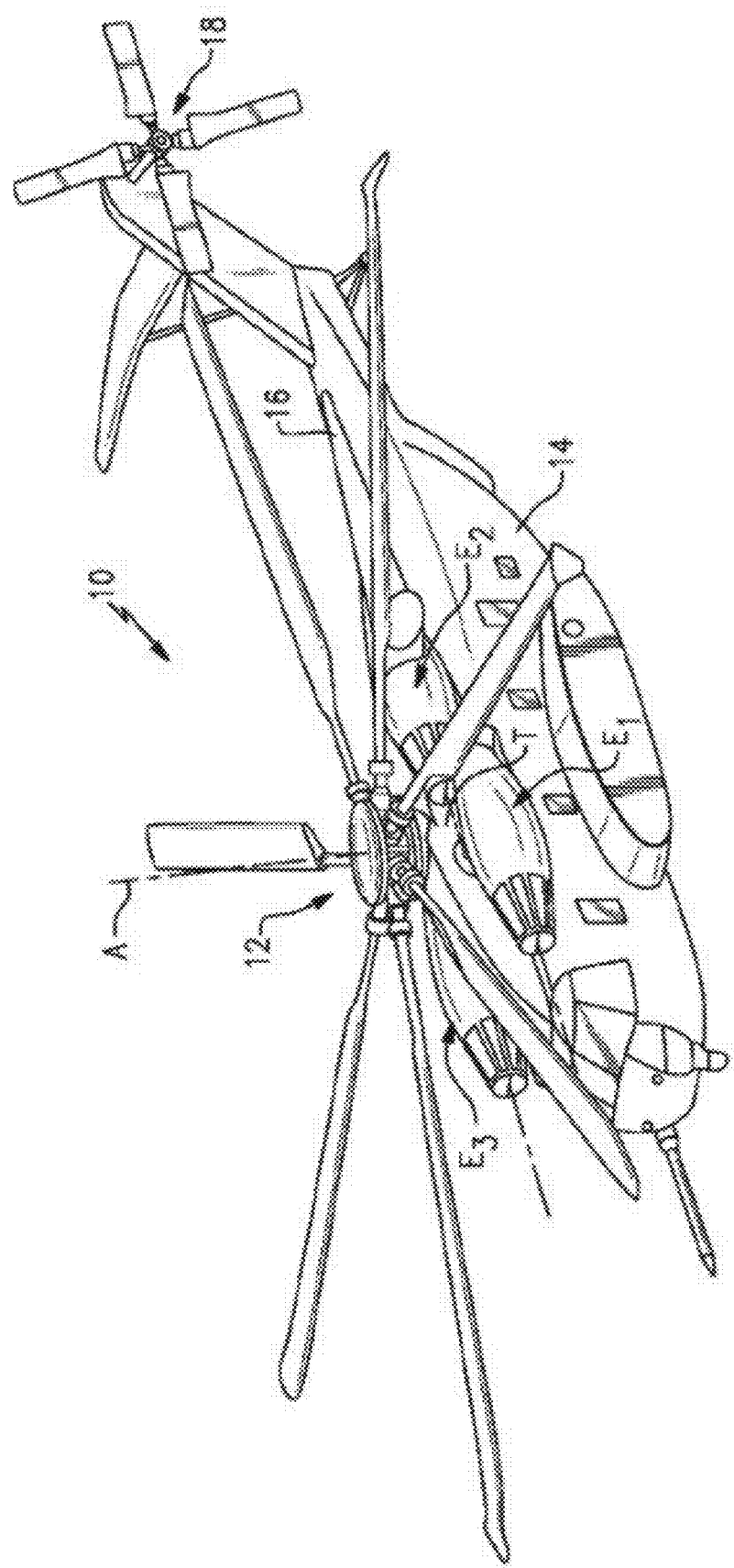
FIG. 1 is a perspective view of an exemplary rotary wing aircraft.
Figure 2:
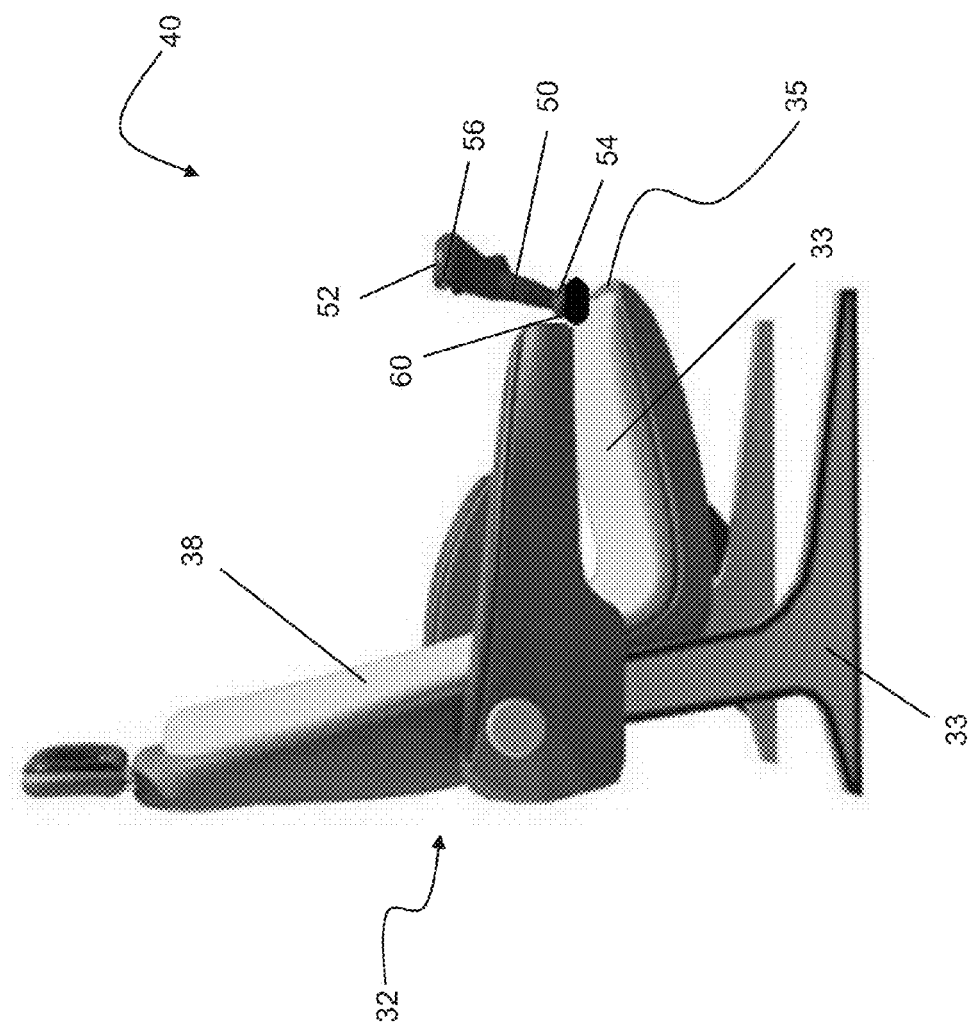
FIG. 2 is a side view of a seat having an inceptor according to an embodiment of the invention.

FIG. 1 schematically illustrates an exemplary vertical take-off and landing (VTOL) rotary wing aircraft 10. The rotary wing aircraft 10 in the disclosed, non-limiting embodiment includes a main rotor system 12 supported by an airframe 14 having an extended tail 16 which includes an anti-torque system 18, such as a tail rotor system for example. The main rotor system 12 is driven about an axis of rotation A through a main rotor gearbox (not shown) by one or more engines E. The main rotor system 12 includes a plurality of blades 30 connected to a rotor hub 20. The main rotor gearbox may be interposed between the one or more engines E, the main rotor system 12 and the anti-torque system 18. The main rotor gearbox is mechanically connected to the main rotor system 12 and to the anti-torque system 18 so that the main rotor system 12 and the anti-torque system 18 may both be driven by the main rotor gearbox. Although a particular rotary wing aircraft configuration is illustrated and described in the disclosed embodiment, other configurations and/or vehicles such as high speed compound rotary wing aircrafts, dual contra-rotating, coaxial rotor system aircrafts, turbo prop aircrafts, tilt rotor or tilt wing aircrafts, and remote pilot stations for remotely controlled aircraft are within the scope of the present invention.

Portions of the VTOL rotary wing aircraft 10, such as the main rotor system 12 or the anti-torque tail rotor system 18 for example, are driven by a flight control system. In one embodiment, the flight control system is a fly-by-wire control system (FBW). In a FBW flight control system, there is no direct mechanical coupling between a pilot's controls and a movable flight control surface. Instead of using cables, a FBW system includes a plurality of sensors which sense the position of the controls and generate electrical signals proportional to the sensed position. The electrical signals are combined with other aircraft data and a signal is provided to a hydraulic or electric actuator configured to move a flight control surface. In an FBW control system, an operator provides input through an interface, such as an inceptor for example. Since the control surfaces of the rotary wing aircraft are controlled through the FBW flight control system, the interface device need not be mechanically linked to the control surfaces.

Figure 3:
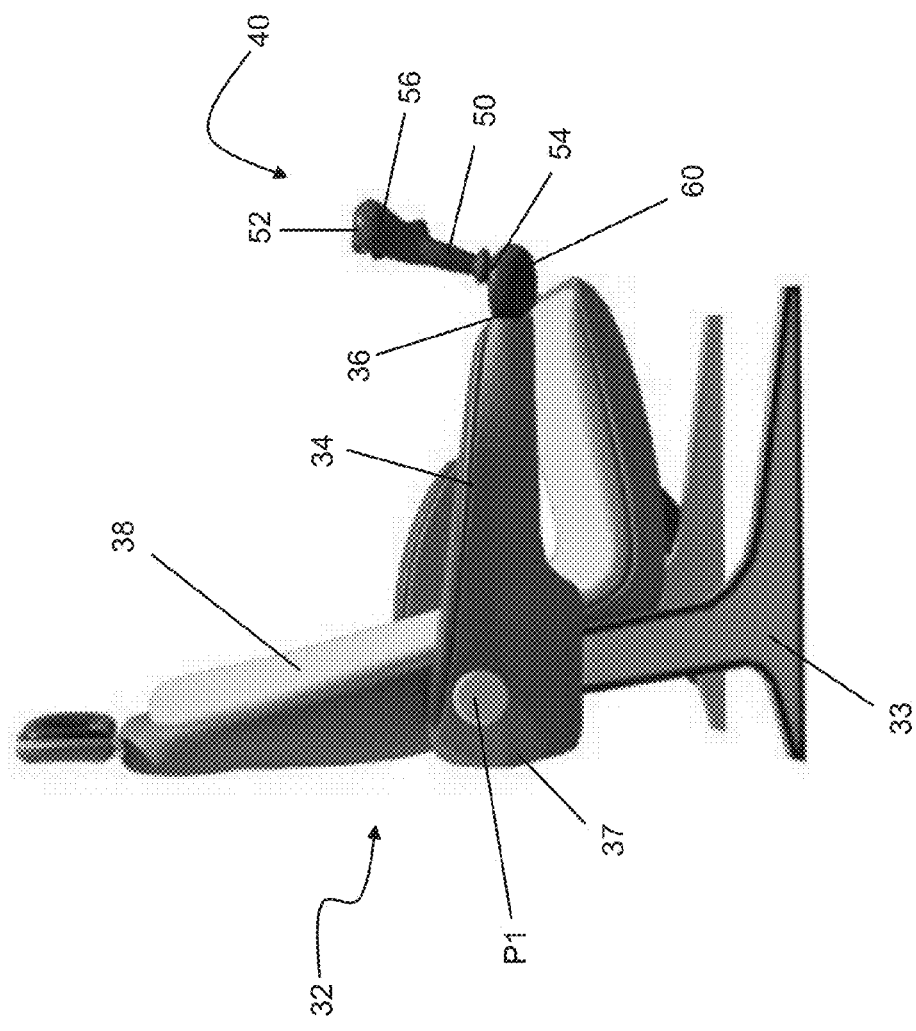
FIG. 3 is a side view of an inceptor control system according to an embodiment of the invention.
Figure 4:
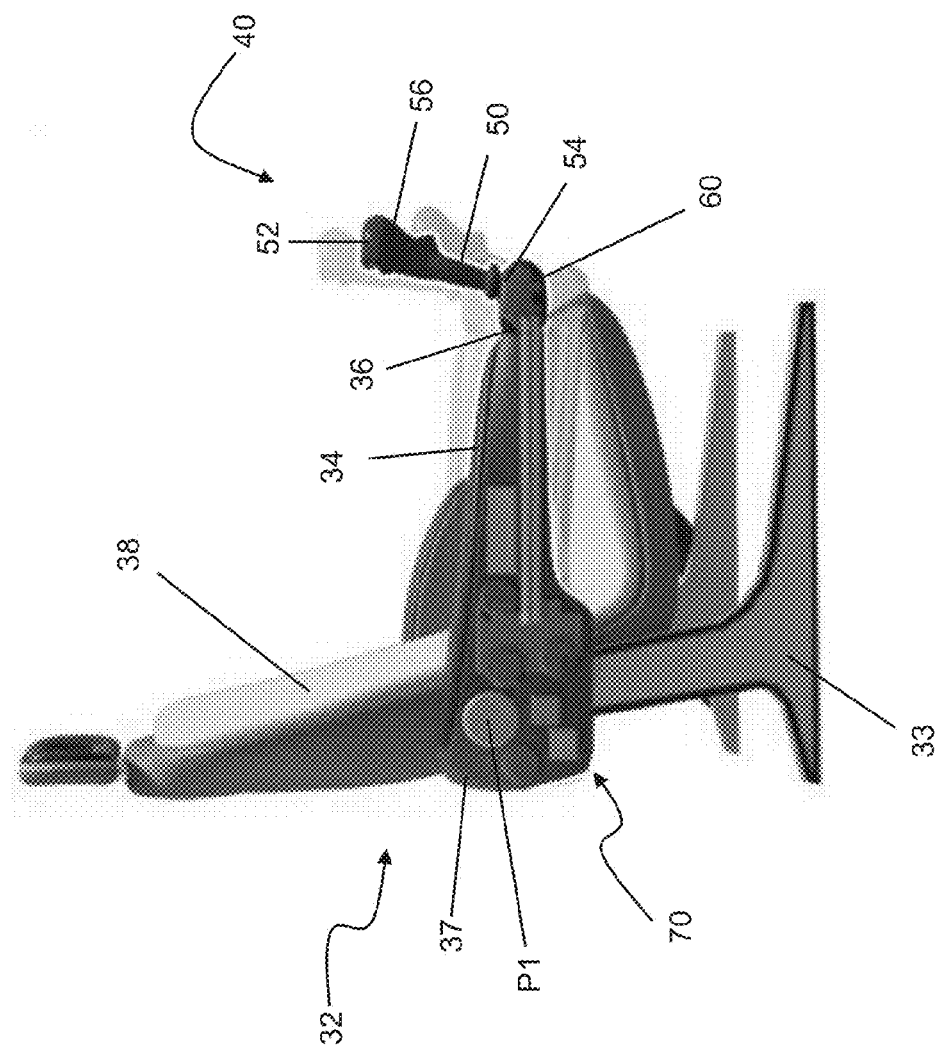
FIG. 4 is a side view of a seat having an inceptor according to an embodiment of the invention.
Figure 5:
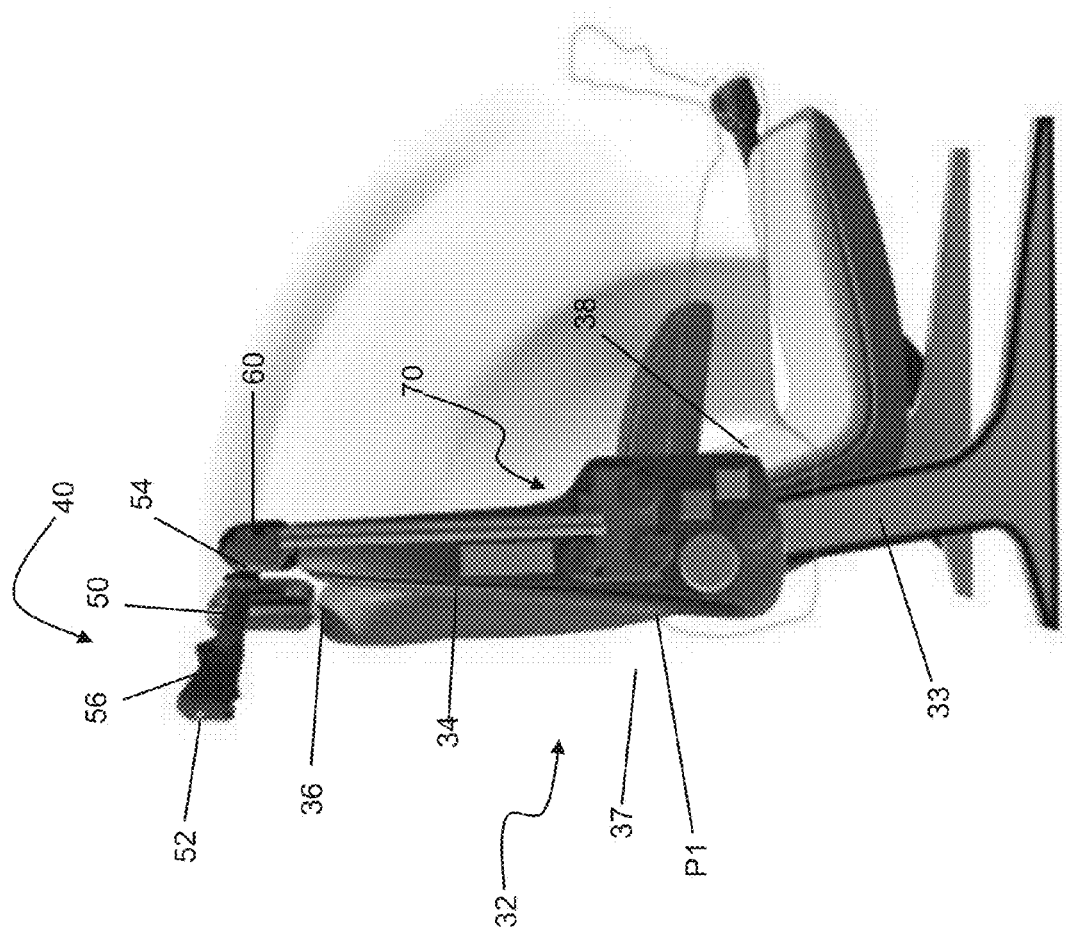
FIG. 5 is a side view of a seat having an inceptor according to an embodiment of the invention.
Figure 6:
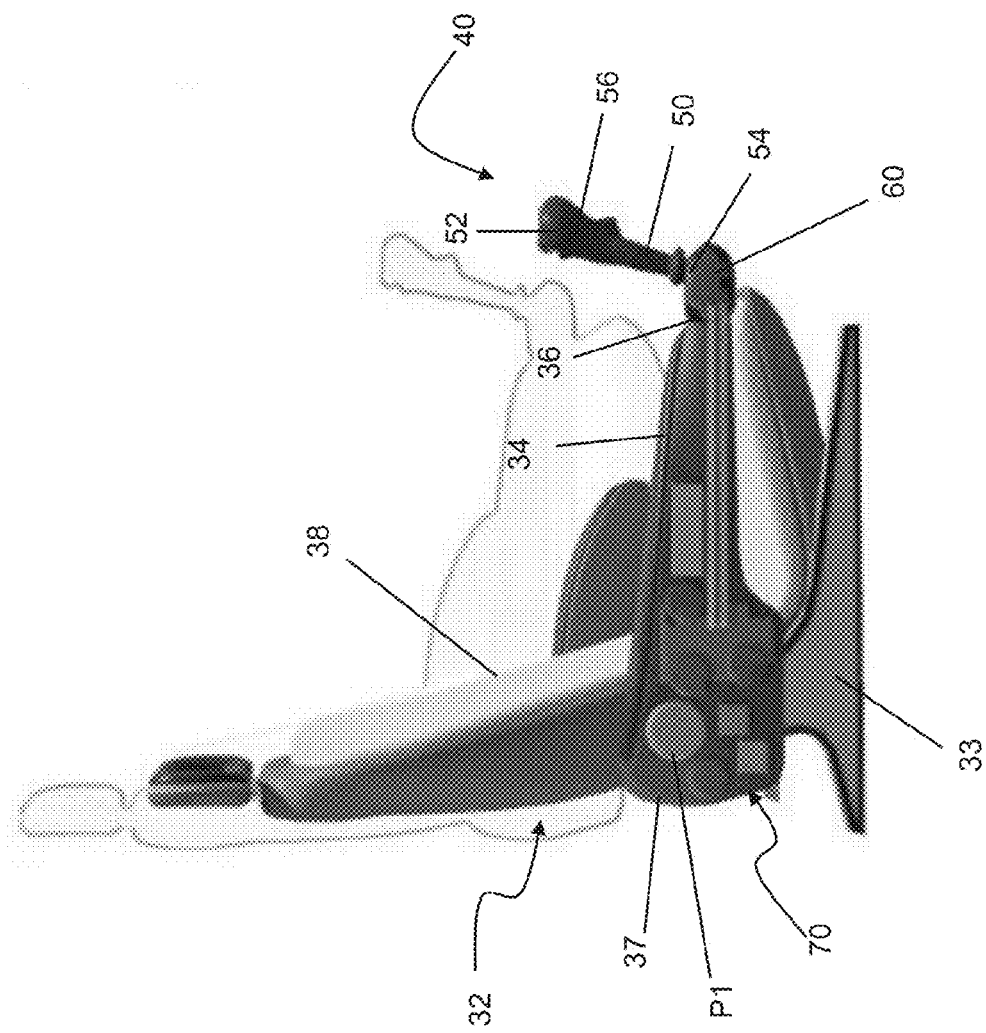
FIG. 6 is a side view of a seat having an inceptor according to an embodiment of the invention.
Figure 7:
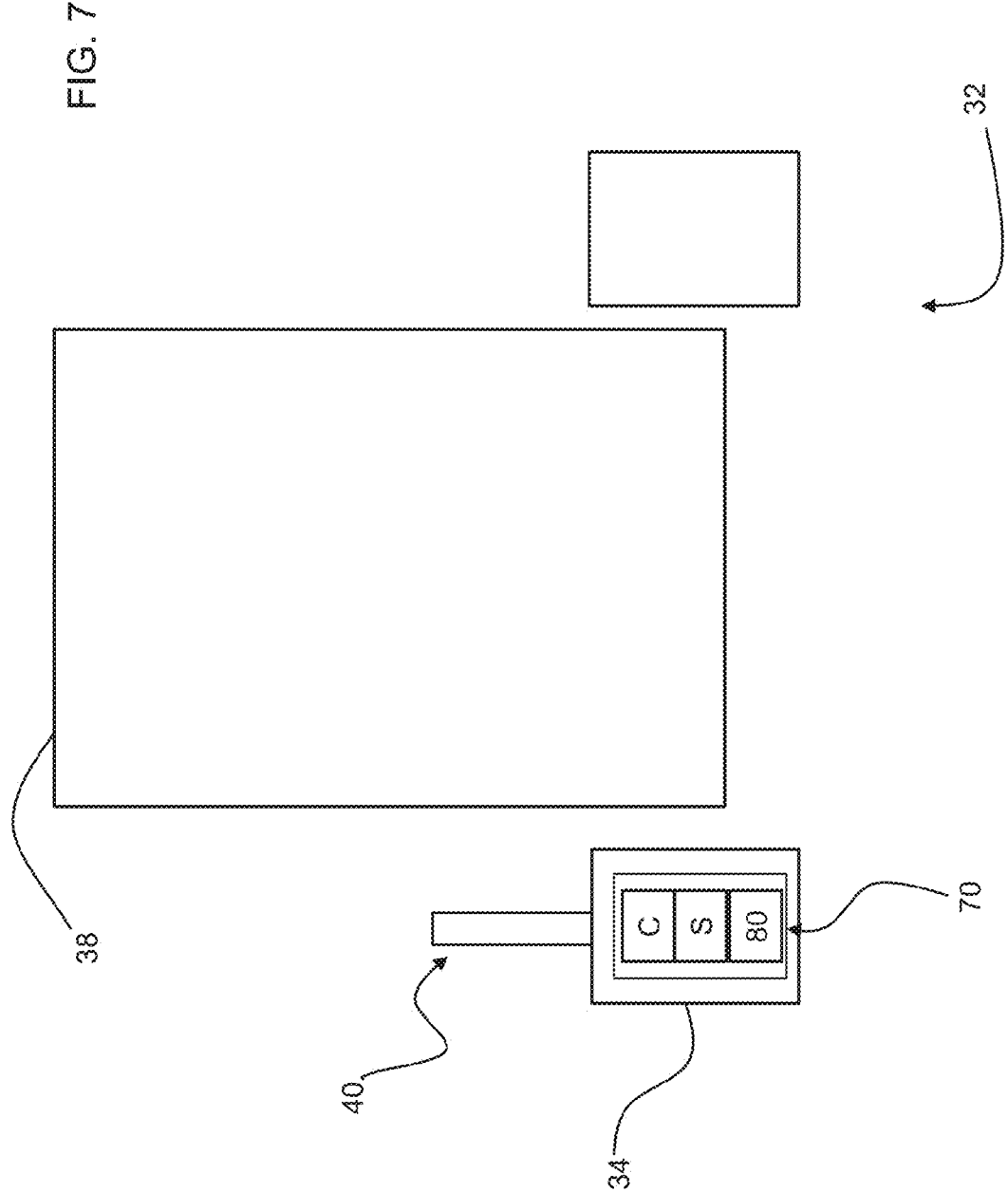
FIG. 7 is a schematic diagram of a flight control system according to an embodiment of the invention.
Figure 8:
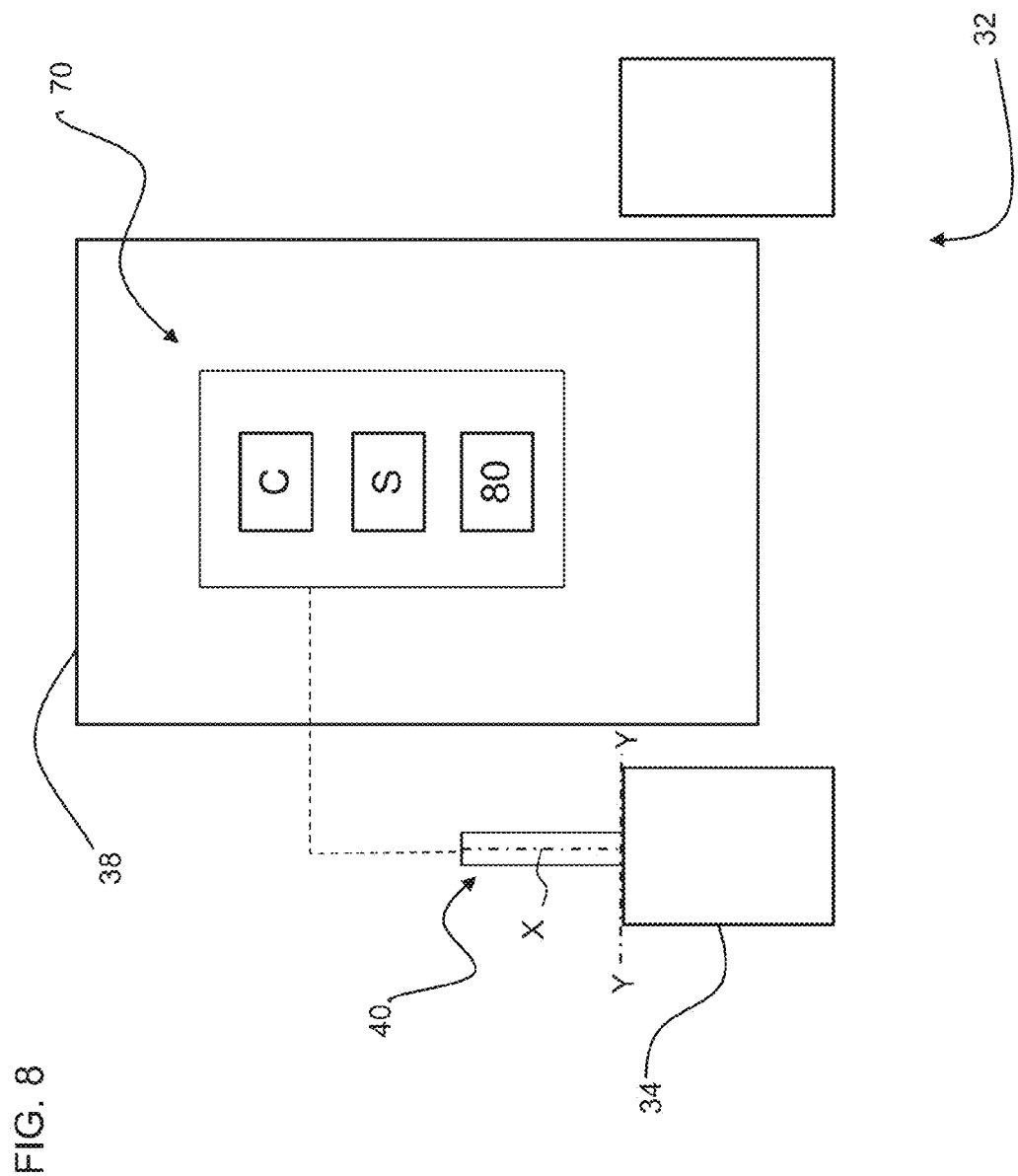
FIG. 8 is a schematic diagram of a flight control system according to an embodiment of the invention.
Figure 9:
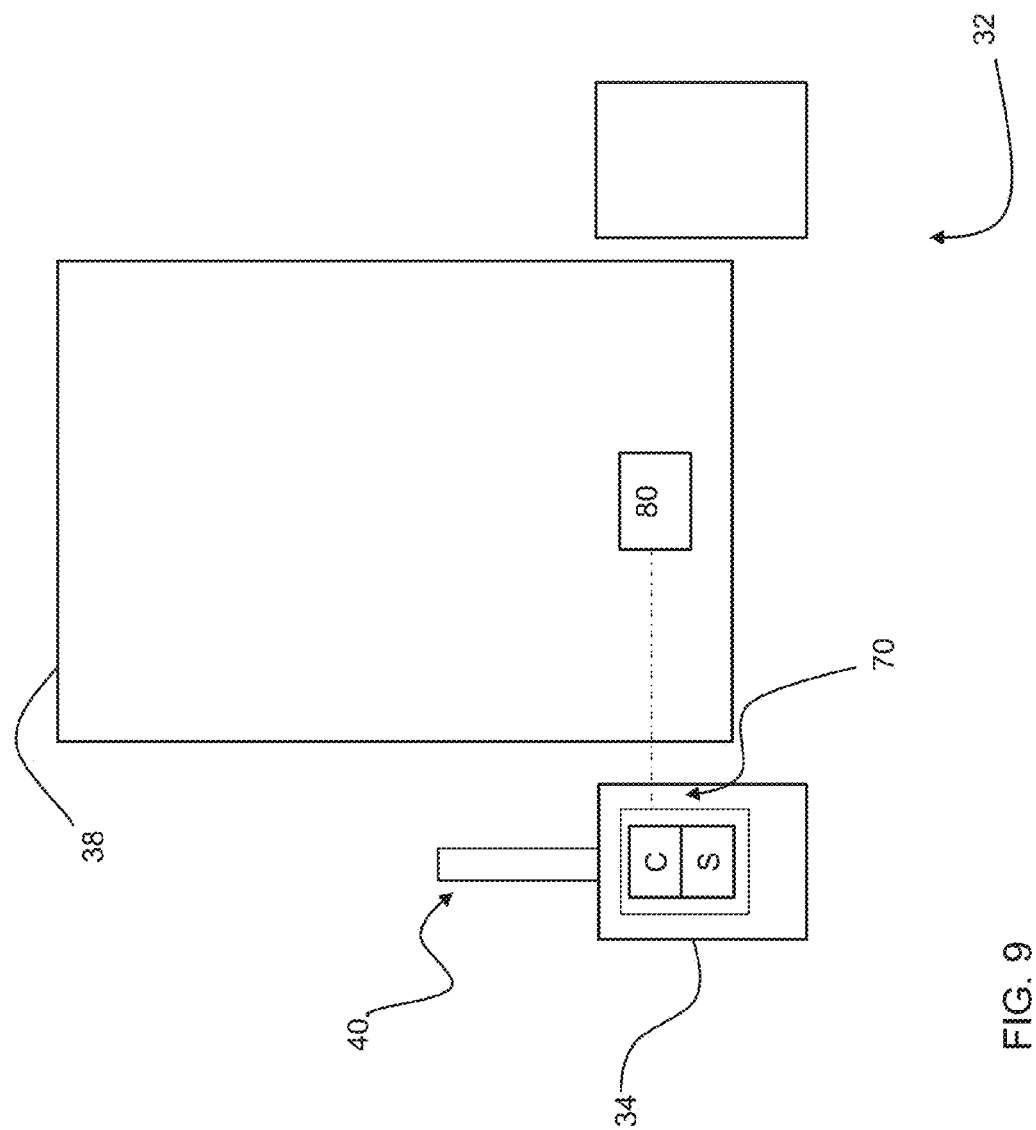
FIG. 9 is a schematic diagram of a flight control system according to an embodiment of the invention.

An inceptor 40 of the rotary wing aircraft 10, illustrated in FIGS. 2-6, is configured to control one or more flight control surfaces of the rotary wing aircraft 10. The illustrated inceptor 40 may be used alone or in conjunction with additional systems, such as one or more foot pedals for example. The inceptor 40 includes an elongated control stick 50 having a generally cylindrical body. The control stick 50 extends upward from a support base 60 mounted in the cockpit of the rotary wing aircraft 10. A first end 52 of the control stick 50 includes a grip 56 that is configured to be grasped by a person's hand. A second, opposite end 54 of the control stick 50 is affixed to a portion of the support base 60 such that the control stick 50 is movable relative to the support base 60 about at least one axis. In one embodiment, the control stick 50 is movable about a plurality of axes, such as axis X and Y for controlling roll, pitch, collective, and yaw of the rotary wing aircraft 10 for example (see FIG. 7). The support base 60 may include any number of structural components suitable for supporting the control stick 50 while permitting movement thereof The inceptor 40 may also include a plurality of input buttons. In one embodiment, the input buttons are positioned near the second end 54 of the control stick 50 and the support base 60. The support base 60 is mounted to a seat 32, such as at the center of the front edge 35 of a seat cushion 33 (FIG. 2), or adjacent the distal end 36 of an arm 34 for example (FIG. 3). In one embodiment, the support base 60 is formed integrally with a portion of the seat 32.

When the inceptor 40 is mounted to a first end 36 of the arm 34, the arm 34 of the seat 32 is intended to support a person's forearm when operating the control stick 50, and in particular when grasping the control stick 50. In one embodiment, the arm 34 of the seat 32 is pivotable relative to the seat 32 about a pin P1 located at a second end 37 of the arm 34 (see FIG. 5). The arm 34 may therefore rotate upwards or downwards and out of the way to provide improved access to the seat 32 or to remove the control stick 50 from the vicinity of a person's hand if desired. In addition, the arm 34 may be rotated incrementally to increase the ergonomic alignment and comfort of the seat 32. In one embodiment, illustrated in FIG. 6, the arm 34 is configured to stroke with the seat 32 relative to a support 33 as the vertical stroking/energy absorbing system of the seat 32 is utilized, such as during a rough landing or crash. By moving the arm 34 with the seat 32, the forearm, upper arm, and shoulder of a person sitting in the seat 32 will remain supported in the same position relative to his or her body, regardless of any vertical movement of the seat 32.

The inceptor 40 additionally includes an inceptor control system 70, as shown in FIGS. 5-10. The inceptor control system 70 is configured to provide input 86 to a controller 92 of the flight control system 90 (see FIG. 10) based on movement of the control stick 50. At least a portion of the inceptor control system 70 is arranged within a portion of the seat 32 to which the inceptor 40 is mounted. For example, at least one of the arm 34, seat cushion 33, and seat back 38 is generally hollow such that the components of the inceptor control system 70 may be located therein. In addition, electrical and mechanical connections that couple the plurality of components of the inceptor control system 70 are also housed within the seat 32. The inceptor control system 70 may be located within only a single portion of the seat 32, for example the arm 34 (see FIG. 7) or the seat back 38 (see FIG. 8). Alternatively the inceptor control system may be located in multiple portions of the seat 32, such as within the arm 34 and the seat back 38 (see FIG. 9) for example. The exemplary, non-limiting inceptor control system 70 described herein is provided for illustrative purposes only. Conventional inceptor control systems 70, including additional components and functionality that are known in the art, are within the scope of the invention.

The control stick 50 is configured to move in response to an input force supplied from an operator, for example, a pilot. Alternatively, movement of the control stick 50 maybe controlled remotely, such as from a remote pilot station for example. The inceptor control system 70 includes one or more sensors S that monitor movement of the control stick 50. The sensors S may be integrated into the grip 56 or support base 60 of the inceptor 40. Exemplary sensors S include but are not limited to position sensors or force transducers for example. The sensors S may be configured to measure position, speed, acceleration, or force applied to the control stick 50. In one embodiment, at least one sensor S is used to measure movement of the control stick 50 about each axis. For example, if the control stick 50 is movable about a pitch axis and a roll axis, the sensors S include at least a pitch sensor S1 for measuring movement of the control stick 50 about the pitch axis and a roll sensor S2 for measuring movement of the control stick 50 about the roll axis.

The inceptor 40 may be implemented as an active inceptor or a passive inceptor. In embodiments where the inceptor 40 is active, the inceptor control system 70 includes at least one feedback component 80, such as a servo or actuator for example. Because of the large size of the feedback components 80, and the limited amount of space within the arm 34, the feedback components 80 may be positioned within the seat arm 34, the seat back 38 or both as required based on the system configuration. The inceptor control system 70 may include a plurality of feedback components 80, for example one for each axis of movement of the control stick 50. The feedback components 80 provide feedback in response to manipulation of the control stick 50 by a human operator. In one embodiment, the feedback components 80 provide more force as more input on the control stick 50 occurs. These feedback components 80 may also provide the operator an indication of how close the operator is to the end of the control capability, such as by providing increasing amounts of resistance for example.

The inceptor control system 70 may also include at least one control C, such as a switch for example. In one embodiment, the control C is a trim switch. If an operator activates a trim switch C in a first axis and then provides an input on control stick 50 along that same axis, the input on that axis is maintained even after the control stick 50 is released. In embodiments where the inceptor 40 is movable about a plurality of axes, the inceptor control system 70 may include a plurality of trim switches C, one for each axis.

Figure 10:
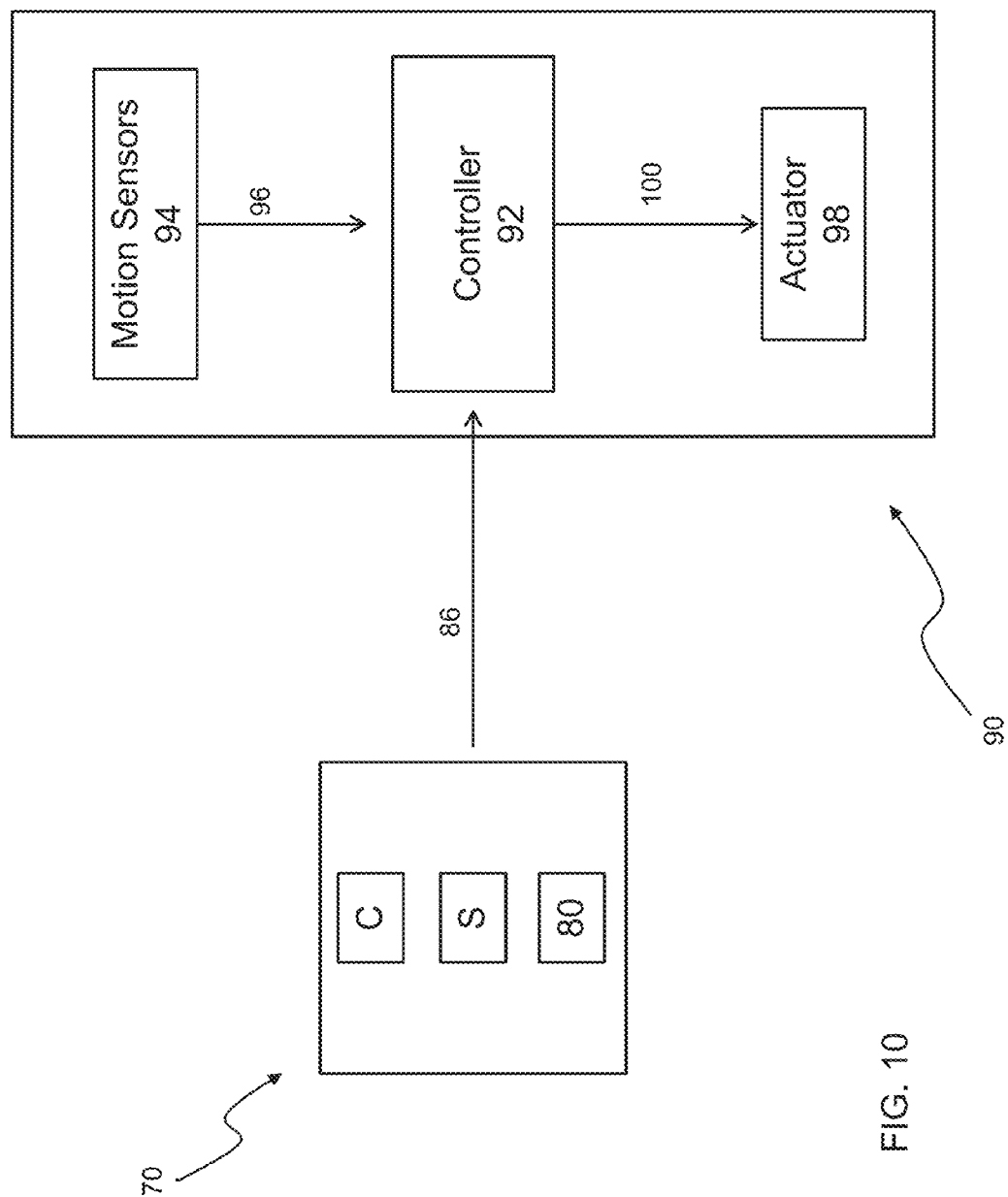
FIG. 10 is a schematic diagram of a flight control system according to an embodiment of the invention.

Referring now to FIG. 10, manipulation of the control stick 50 generates inputs signals 86 which are received by the controller 92 of the flight control system 90 for processing. In one embodiment, the controller 92 is also positioned within a portion of seat 32. Exemplary input signals include a pitch input signal, a roll input signal, and a yaw input signal. The controller 92 also receives flight data 96 from a plurality of motion sensors 94, indicative of the acceleration, angular rate, and attitude of the rotary wing aircraft 10. The controller 92 uses the input signals 86 provided by the inceptor controller system 70 and the flight data 96 to create actuator command signals 100. Actuators 98 are coupled to each of the control surfaces (not shown) of the rotary wing aircraft 10. Each actuator 98 is coupled to receive an actuator command signal 100 supplied from the controller 92. Upon receipt of the actuator command signal 100, each actuator 98 is configured to move its associated control surface to the commanded position to adjust the pitch, roll, and yaw of the rotary wing aircraft 10.

Conventional inceptors in a rotary wing aircraft 10 include a box approximately the size of a briefcase for housing the components of the inceptor control system 70. The box was typically positioned on the floor of the cockpit adjacent a pilot's seat. By integrating the inceptor 40 into the seat 32, the space within the cockpit of the rotary wing aircraft 10 is maximized Removing the inceptor control system 70 from the floor, makes it easier for a person to get in and out of the seat 32, thus allowing a broader range of persons to access the seat than previously. In addition, other components and functionality may be incorporated into the inceptor control system 70 that was not previously possible due to stringent size constraints. Integration of the inceptor 40 into a pivotable arm 34 that strokes with the seat back 38 enhances ergonomics and safety of the seat 32 for the pilot.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An inceptor comprising:
   a control stick mounted to a seat, the control stick being movable about at least a first axis; and
   a fly-by-wire inceptor control system, arranged at least partially within the seat, the inceptor control system being configured to provide input signals indicative of movement of the control stick to a flight control system, wherein the inceptor control system includes at least one switch configured to maintain an input provided to the control stick even after a force applied to the control stick is removed, the at least one switch being housed within a portion of the seat and at least one feedback component configured to provide feedback to the control stick when a force is applied to the control stick, the at least one feedback component being housed within a seat back of the seat.

2. The inceptor according to claim 1, wherein the seat includes an arm and the control stick is mounted to a distal end of the arm.

3. The inceptor according to claim 1, wherein a portion of the inceptor control system is housed within an arm of the seat.

4. The inceptor according to claim 1, wherein a first end of the control stick includes a grip.

5. The inceptor according to claim 1, wherein a second end of the control stick is mounted to a support base.

6. The inceptor according to claim 5, wherein the support base is formed integrally with the seat.

7. The inceptor according to claim 2, wherein the arm is configured to rotate relative to the seat.

8. The inceptor according to claim 2, wherein the arm is configured to stroke with the seat.

9. The inceptor according to claim 1, wherein the inceptor control system includes at least one sensor configured to monitor movement of the control stick about the first axis.

10. An aircraft comprising:
    at least one control surface for adjusting an orientation of the aircraft;
    a cockpit having a seat;
    a control stick mounted to the seat, the control stick being movable about at least a first axis; and
    a fly-by-wire inceptor control system arranged at least partially within the seat, the inceptor control system being configured to provide input signals indicative of movement of the control stick to a flight control system to move the at least one control surface, wherein the inceptor control system includes at least one switch configured to maintain an input provided to the control stick even after a force applied to the control stick is removed, the at least one switch being housed within a portion of the seat and at least one feedback component configured to provide feedback to the control stick when a force is applied to the control stick, the at least one feedback component being housed within a seat back of the seat.

11. The aircraft according to claim 10, wherein the seat includes an arm and the control stick is mounted to a distal end of the arm.

12. The aircraft according to claim 10, wherein at least a portion of the inceptor control system is housed within an arm of the seat.

13. The aircraft according to claim 10, wherein a first end of the control stick includes a grip.

14. The aircraft according to claim 10, wherein a second end of the control stick is mounted to a support base.

15. The aircraft according to claim 13, wherein the support base is formed integrally with the seat.

16. The aircraft according to claim 11, wherein the arm is configured to rotate relative to the seat.

17. The aircraft according to claim 11, wherein the arm is configured to stroke with the seat.

18. The aircraft according to claim 10, wherein the inceptor control system includes at least one sensor configured to monitor movement of the control stick about the first axis.

19. The aircraft according to claim 10, wherein the movement of the inceptor may be controlled remotely from a remote pilot station.

* * * * *